United States Patent [19]
Boyd et al.

[11] 3,790,260
[45] Feb. 5, 1974

[54] HIGH STRENGTH OPHTHALMIC LENS
[75] Inventors: David C. Boyd, Corning; Joseph M. Williams, Horseheads, both of N.Y.
[73] Assignee: Corning Glass Works, Corning, N.Y.
[22] Filed: July 31, 1972
[21] Appl. No.: 276,725

Related U.S. Application Data
[63] Continuation-in-part of Ser. No. 215,075, Jan. 3, 1972, abandoned.

[52] U.S. Cl. .................... 351/159, 351/166, 65/30
[51] Int. Cl. ............................................. G02c 7/02
[58] Field of Search ................. 351/159, 166; 65/30

[56] References Cited
UNITED STATES PATENTS
3,533,888  10/1970  Eppler et al. .................... 351/159 X Primary Examiner—David H. Rubin
Attorney, Agent, or Firm—Clinton S. James, Jr

[57] ABSTRACT

An ophthalmic glass lens has an internal zone in which the tensile stress is less than three kg./mm.$^2$ and a compressively stressed, ion-exchanged surface zone that is at least four mils in depth and in which the compressive stresses generate a modulus of rupture greater than 35,000 psi. The lens is molded from a preferably lime-free, alkali silicate glass containing, by weight on the oxide basis, 12–20% $Na_2O$ plus $K_2O$, 10–20% ZnO plus MgO plus $TiO_2$, and 1–5% $Al_2O_3$, and is chemically strengthened by an exchange of potassium ions for sodium ions in the surface layer of the lens at a temperature below the strain point of the glass. A surface abraded lens will withstand fracture from the impact of a 5/8 inch diameter steel ball dropped from a height of 50 inches, but if broken by a point impact, has a breakage pattern of a few large pieces.

4 Claims, No Drawings

HIGH STRENGTH OPHTHALMIC LENS

This application is a continuation-in-part of our pending application, Ser. No. 215,075, filed Jan. 3, 1972 and now abandoned.

This invention relates to a chemically strengthened, molded ophthalmic lens that will provide a high degree of resistance to fracture by impact, even after surface abrasion, and which will also minimize the risk of eye damage even if breakage does occur. It is particularly concerned with a method for producing such a chemically strengthened lens, and with a family of glasses uniquely adapted to the production of this product.

Lens blanks for ophthalmic purposes may be considered as either unifocal or multifocal. The former, commonly known as a single vision lens, is generally molded from a crown glass in the shape of a disc which is then ground and polished to a predetermined surface contour if a prescription lens is required. Two types of multifocal lenses are in common use. The first is known as the "one piece-type" lens. Here, different magnifications are generated in a single piece of glass (a unitary lens) by grinding the lens surface to different curvatures in different portions thereof. The second is known as the "fused-type" lens. Here, a similar crown glass disc or blank is formed, but the outer or convex surface has a depression formed therein within which a small glass element, composed of a flint glass of high refractive index, is sealed. This flint glass element is commonly referred to as a button. The present invention is concerned with both types of lens blanks; that is, either unifocal or multifocal, and the term "ophthalmic lens blank" should be so understood. However, it is concerned with treatment of, and characteristics in, the crown glass blank.

A primary glass characteristic or property to consider in the production of the crown glass blank for an ophthalmic lens is the refractive index of the glass. In general, glasses having a refractive index in the range of 1.515 to 1.530 are used for this purpose, and the term "ophthalmic crown glass" is commonly applied to such glasses. The accepted industry standard for refractive index is presently 1.523 and commercially acceptable glasses must meet that requirement.

A glass should, of course, have good chemical durability. Further, it should have a low liquidus temperature and a softening point in the range of 720°–760°C. for suitable sealing characteristics in a multifocal lens. In addition, an ophthalmic crown glass suitable for use in multifocal lenses should have a thermal coefficient of expansion (0°–300°C.) in the range of 90–95 × $10^{-7}/°C.$, preferably 92–95 × $10^{-7}/°C.$, to provide proper seal match.

Traditionally, the ophthalmic glass industry has employed soda-lime-silica glasses for the production of ophthalmic lens blanks, except as special characteristics or problems have necessitated modified glasses. In general, the traditional soda-lime-silica glasses consist essentially of 55–75% $SiO_2$, 15–20% $Na_2O$ plus $K_2O$, and 8–15% lime (CaO) with up to 2% $Al_2O_3$ and the usual minor amounts of fining agents and colorants if required. Divalent metal oxides other than lime may be employed for such purposes as adjusting refractive index, but a lime-type glass has usually been preferred because of the ready availability of high purity raw materials at relatively low cost.

U.S. Pat. No. 2,913,345, granted Nov. 17, 1959 to J. E. Duncan, is concerned with the production of lens blanks into which flint glass buttons may be sealed to produce multifocal lenses. The patent points out that the conventional lime glasses have proven unsatisfactory because bubbles tend to form at the glass interface during the sealing operation. The patent discloses that this is avoided by substituting a combination of ZnO and $TiO_2$ for the lime component, thus producing a family of $R_2O$–ZnO–$TiO_2$–$SiO_2$ glasses for this purpose.

U.S. Pat. No. 3,148,073, granted Sept. 8, 1964 to J. J. Smith and W. J. Englert, describes a similar family of $R_2O$–ZnO–$TiO_2$–$SiO_2$ glasses as a replacement for lead glasses used in the production of molded, colored lenses for welders' goggles. The patent points out that devitrification problems which occurred in the lead glasses are avoided in the ZnO–$TiO_2$ glasses.

Problems have also been encountered in attempting to introduce colorants into soda-lime-silica glasses to produce filters or sunglasses. A particular problem has been the color control necessary to produce a neutral or gray color in such glass. Consequently, U.S. Pat. No. 2,688,561, granted Sept. 7, 1954 to W. H. Armistead, and U.S. Pat. No. 3,094,423, granted June 18, 1963 to E. K. Davis, each describe a family of $R_2O$–ZnO–$SiO_2$ glasses in which the ZnO provides a degree of color control lacking in the conventional lime glass.

The individual wearing corrective lenses is well aware that replacement of broken lenses is a constant source of expense and inconvenience. Consequently, serious efforts have been directed at the production of strengthened glass lenses. Thus far, however, the results have been somewhat less than satisfactory.

One solution to the problem is a thicker lens such as is used in many types of safety goggles. The consequent increased weight is uncomfortable to the wearer. Therefore, safety lenses have remained a special or emergency measure for high risk industrial areas.

It has also been proposed to air temper ophthalmic lenses. The tempering operation, however, involves relatively high temperatures which may cause distortion of surface contour that is prohibitive in a prescription ground lens. Furthermore, it is well known that glass articles less than about one-eighth inch in thickness are very difficult to effectively temper by air chilling. Inasmuch as many ophthalmic lenses are on the order of two to three millimeters thick, air tempering has not provided an adequate solution to the lens strengthening problem.

Consequently, when a low temperature process for chemically strengthening glass was developed a decade ago, the ophthalmic lens was one of the first product candidates. The early promise of this new strengthening procedure was limited by the discovery, as particularly described in United Kingdom Specifications 966,732 and 966,733 published Aug. 12, 1964, that at least 5% alumina ($Al_2O_3$) or zirconia ($ZrO_2$) was apparently necessary in a glass composition in order to attain a practical strengthening effect of a permanent nature in a glass article by this procedure. It is there shown that the relatively shallow compressively stressed layer produced in other types of glass, for example a soda-lime glass, is such that the strengthening effect is essentially completely lost when the surface is subjected to even mild abrasive influences such as inevitably occur in service.

As reported in the United Kingdom specifications, ophthalmic lenses were produced from the alumina and/or zirconia glasses which easily passed prescribed impact tests. However, these glasses had very different physical characteristics from those with which the ophthalmic glass industry was familiar. In particular, as shown in a table entitled "Mechanical Hardness" on page 42 of "Glass Engineering Handbook" by E. B. Shand, 2nd edition, (1958), these glasses have a greater mechanical hardness than soda-lime glasses for example. This leads to difficulty in grinding and polishing articles molded from such glasses. The alumino- and zirconosilicate glasses also have relatively high viscosity-temperature characteristics which result in softening points that are too high for sealing purposes as well as relatively high glass melting and working temperatures. Accordingly, there has been a reluctance to adopt either of these types of glass for ophthalmic lens production.

The emphasis on development of a satisfactory method of chemically strengthening an ophthalmic lens blank has recently received renewed emphasis from a federal requirement that all such blanks be capable of passing a minimum impact test. More specifically, it has been proposed that all such blanks be capable of withstanding the impact of a 5/8 inch steel ball dropped from a distance of 50 inches on the convex surface of the glass lens.

It will be understood that a strengthened ophthalmic lens capable of providing satisfactory service must not only resist breakage by impact as produced but, as a practical matter, it must also provide such resistance even after the lens surfaces have been abraded as will occur from handling and cleaning both in production and by the user. Also, the lens must necessarily meet the usual ophthalmic requirements.

It is desirable, however, that the lens have a particular type of breakage pattern when breakage does occur from a low energy point impact-type fracture. The lens should then break into a few large pieces, preferably two pieces, which can be held in place in a frame. Further, there should be no tendency for explosive force that would cause glass pieces to be propelled into or toward the eye. This means that any forces generated in the article must be carefully controlled.

We have now found that a suitably strengthened ophthalmic lens blank should have a compressively stressed surface layer that is over four mils in depth. The degree of compression developed in the stressed surface layer should be sufficient to provide a modulus of rupture of at least 35,000 psi and preferably 60,000 psi in the article. Also, the corresponding and counter tensile stress that is necessarily generated in the central zone within the compressively stressed surface layer should be maintained below three kg./mm.$^2$.

We have further found that an ophthalmic lens blank having these characteristics can be produced by molding the lens from a glass having a composition within limited oxide ranges and thereafter exchanging potassium for sodium ions in a surface layer on the article in a low temperature ion exchange process.

The chemically strengthened, ophthalmic glass lens of the present invention has an internal zone in which the tensile stress is less than three kg./mm.$^2$, and a compressively stressed, ion-exchanged surface zone that is at least four mils in depth and in which the compressive stresses generate a modulus of rupture that is over 35,000 psi, the lens being molded from a preferably lime-free, silicate glass consisting essentially of 3–15% $Na_2O$, 3–15% $K_2O$, the total $Na_2O$ plus $K_2O$ being 12–20 percent, 0–15% $ZnO$, 0–15% $MgO$, 0–5% $TiO_2$, the total $ZnO$ plus $MgO$ being 8–20 percent, and the total $ZnO$ plus $MgO$ plus $TiO_2$ being 10–20 percent, 1–5% $Al_2O_3$, 0–5% $ZrO_2$, 0–2% $B_2O_3$, 0–5 percent other alkali metal oxides and, optionally, minor amounts of glass colorants including $Fe_2O_3$, $CoO$, $NiO$, $Cr_2O_3$, $MnO_2$, $CeO_2$, and $CuO$, the balance of the composition being essentially silica. The lens is produced by molding a suitable shape from a body of molten glass having a composition as indicated, contacting the molded glass body with a salt containing exchangeable potassium ions at a temperature above 350°C., but below the strain point of the glass and preferably within the range of 20°–120°C. below the glass strain point, for a period of time sufficient to exchange potassium for sodium ions to a depth of at least four mils within the surface of the glass.

The tensile stress within the internal zone in the lens of the present invention must be maintained below a value of three kg./mm.$^2$ for at least two reasons. First, with the tension maintained below such value, there is little chance for any minute check or flaw that develops in the article surface to propagate through the lens. Second, in the event that a fracture does occur within a lens, as, for example, in a low energy point impact of the center punch type, the lens will ordinarily break into two pieces, or at least in relatively large pieces. With high internal tension values, there is a tendency for the glass to break with violence, and to shatter into fine pieces which may enter the eye of the individual wearing the lens or otherwise cause serious harm.

The compression layer generated on the surface of the lens by ion exchange must be of sufficient depth to maintain the strengthened character of the article even after abrasion of the surface. Thus, conventional soda-lime glass lens blanks can be satisfactorily strengthened to meet prescribed tests, but this improvement in strength is rapidly lost when the lens is subjected to even mild abrasion such as occurs in handling and usage.

In order to determine the actual damage occurring to ophthalmic lenses in service, several hundred used lenses were examined microscopically and the depths of scratches on the glass surface were observed. This study indicated that on the order of 99 percent of all scratches are less than four mils in depth. On this basis, we decided that a compressively stressed, ion-exchanged, strengthened layer must be at least four mils in depth to provide effective strengthening of a lasting character.

In addition to a depth of at least four mils, the compressive stress generated in the glass surface by ion exchange must be of sufficient magnitude to provide a modulus of rupture greater than 35,000 psi in order to withstand the prescribed impact without breakage. For optimum protection, a modulus of rupture of at least 60,000 psi is preferred. Modulus of rupture measurements are made in conventional manner by flexing a bar or rod of glass resting on spaced knife edge supports. Depth of layer and internal tension are measured by polarimetric methods and equipment well known in the stress measuring art.

It has been found that the various composition limits must be carefully observed to provide a glass that is capable of having imparted thereto the various stress characteristics set forth above as well as the conventional optical characteristics of ophthalmic lenses. A suitable glass must contain at least 3% soda ($Na_2O$) to provide sufficient sodium ions for ion exchange purposes and consequent glass strengthening. The potassia ($K_2O$) content is necessary in order to accelerate the rate of ion exchange in the glass. For this purpose, the $K_2O$ content must be greater than about 3%. Each of these oxides tends to increase the coefficient of expansion of a glass and decrease the softening temperature. Accordingly, in order to maintain suitable expansion coefficients and softening point characteristics for multifocal sealing purposes, the individual contents of $Na_2O$ and $K_2O$ should not exceed 15 percent and their total content should not exceed 20 percent. For optimum sealing and strengthening characteristics, a $Na_2O$ content of 6–11 percent and a $K_2O$ content of 7–12 percent, respectively, are preferred. The other alkali metal oxides, in particular $Rb_2O$, $Cs_2O$, and $Li_2O$ may be present in amounts up to 5 percent by weight total, but are generally avoided unless required to adjust properties such as glass viscosity or expansion coefficient characteristics.

Experience indicates that the presence of lime (CaO) in a glass tends to block or otherwise inhibit ion exchange between potassium and sodium ions. This results in a small depth of compression layer which, while providing a substantial degree of unabraded strength, will not provide any substantial degree of abraded strength; that is, strength retained in the article after surface abrasion. Accordingly, it is desirable to avoid the presence of lime in glasses for the present purposes, although up to about 3 percent may be tolerated which can improve the melting and forming properties of the glass and assist in the control of the refractive index thereof.

It is well known that other divalent metal oxides may be substituted for lime in the control of refractive index in a glass. The present glasses are based on the discovery that the oxides of zinc and/or magnesium may be used for this purpose without the detrimental effect of calcium on ion exchange. Thus, glasses in which zinc and/or magnesium oxides are employed as refractive index control oxides are capable of being strengthened to a depth greater than four mils by potassium-for-sodium ion exchange within a reasonable time.

The present glasses require a content of at least 10% ZnO plus MgO plus $TiO_2$, with the total ZnO plus MgO being at least 8 percent, in order to provide adequate refractive index in the glass and also provide an ion exchange rate that provides the desired depth of ion exchange, and hence compression, in a reasonable time. In the absence of titania, the content of ZnO plus MgO must be at least 10 percent. Individual contents of MgO or ZnO greater than about 15 percent, or a total content greater than about 20 percent, raise the index too high and there is a tendency for devitrification problems to develop due to increased liquids temperature. Further, the $TiO_2$ content must not exceed 5 percent because of color tendencies.

The oxides of aluminum and zirconium also increase the rate at which ion exchange occurs within the glass. The presence of at least 1% $Al_2O_3$ is necessary both for this reason and to provide adequate chemical durability in the glass. Individually, or collectively, these oxides should not exceed about 5 percent by weight since larger amounts tend to render the glass difficult to melt, and also to grind and polish in the case of prescription lenses.

Boric oxide ($B_2O_3$) is commonly used to soften glasses. However, it also has a deleterious effect on the strengthening capability of a glass. Accordingly, the content of this oxide in glasses should not exceed about 2 percent by weight.

In addition, minor amounts of other compatible glass-making oxides, in particular the known glass colorants and fining agents, may be employed in the present glasses in known manner and amount. The balance of the glass, of course, is the glass forming oxide silica.

The invention is further illustrated by reference to the following table which sets forth, in percent by weight on the oxide basis as calculated from the batch, the compositions of several glasses that are particularly useful in producing the ophthalmic lenses of the invention. In addition, the table sets forth several properties measured on glasses having the indicated compositions. In the table, the following legend is used:

glass softening point — Soft. Pt. (°C.)
glass strain point — St. Pt. (°C.)
Coefficient of thermal expansion (0°–300°C.) — Exp. × $10^{-7}$/°C.
refractive index — Index
time of ion exchange — Time (hrs.)
temperature of ion exchange — Temp. (°C.)
depth of compression layer — Depth (mils)
central tensile stress — CT (kg./mm.$^2$)
modulus of rupture — MOR × $10^{-3}$ (psi)
abraded ⅝ inch ball drop, minimum breakage height — Ball Drop (in.)

TABLE 1

|  | 1 | 2 | 3 | 4 | 5 | 6 | 7 | 8 |
|---|---|---|---|---|---|---|---|---|
| $SiO_2$ | 63.6 | 62.6 | 62.9 | 63.0 | 62.1 | 64.4 | 67.2 | 65.4 |
| $Al_2O_3$ | 1.8 | 1.8 | 2.7 | 2.8 | 2.8 | 1.8 | 2.2 | 1.9 |
| MgO |  |  |  | 2.9 | 2.9 |  | 7.6 |  |
| $Na_2O$ | 7.4 | 4.9 | 8.3 | 7.6 | 8.5 | 10.0 | 8.8 | 12.4 |
| $K_2O$ | 11.2 | 14.8 | 9.2 | 11.5 | 9.5 | 7.6 | 9.8 | 4.3 |
| ZnO | 11.5 | 11.4 | 14.7 | 8.8 | 11.8 | 11.6 | 3.1 | 11.8 |
| $TiO_2$ | 4.2 | 4.2 | .7 | 2.9 | .7 | 4.3 | .8 | 4.4 |
| $Sb_2O_3$ |  |  | .4 |  | .4 |  | .4 |  |
| $As_2O_3$ | .3 | .3 | .2 | .5 | .2 | .3 |  | .5 |
| $B_2O_3$ |  |  | .9 |  | 1.0 |  |  |  |
| Soft. pt. (° C.) | 746 | 774 | 742 | 752 | 739 | 728 | 766 | 716 |
| St. pt. (° C.) | 513 | 527 | 506 | 509 | 505 | 503 | 507 | 496 |
| Exp.×$10^{-7}$/° C. | 95.0 | 93.8 | 92.6 | 95.7 | 93.6 | 92.4 | 94.4 | 91.8 |
| Index | 1.53 | 1.529 | 1.524 | 1.524 | 1.524 | 1.53 | 1.515 | 1.53 |
| Time (hrs.) | 16 | 16 | 16 | 16 | 16 | 16 | 16 | 16 |
| Temp. (° C.) | 420 | 420 | 460 | 460 | 460 | 440 | 460 | 460 |
| Depth (mils) | 5.1 | 4.8 | 4.0 | 6.0 | 4.2 | 4.1 | 4.1 | 4.3 |
| CT (kg./mm.$^2$) | 1.8 | 1.3 | 2.35 | 2.6 | 1.9 | 1.8 | 1.7 | 1.8 |
| MOR (p.s.i.) | 64 | 67 | 63 | 59 | 67 | 64 | 69 | 51 |
| Ball drop (in.) | 99 | 113 | 72 | 113 | 172 | 99 |  | 99 |

A glass batch was formulated corresponding to each of the compositions in Table 1 and based on commonly available ingredients including sand, alumina hydrate, alkali metal nitrates and sulfates, calcined magnesia, and oxides of zinc, titanium, antimony, and arsenic. The glass batches were melted at 1,450°C. For 5 hours and then poured into patties. These were then ground into standard size ophthalmic lens blanks of approximately 2 mm. Thickness and/or cut into rectangular stress bars ¼ × 0.080 inch × 4 inches or 1½ inches in length depending on the tests to be performed. The four inch stress bars were used for strength measurements based on the force required to break a bar in flexure with the bar resting on spaced knife edges in well known manner. The 1½ inches bars were used for polarimetric examination.

Prior to testing for strengthening, both cane and lens samples were immersed in a molten potassium nitrate bath operating at a temperature below the glass strain temperature. They were kept in the bath at temperature for 16 hours to exchange potassium ions from the salt with sodium ions from a surface layer on the glass. As is well known, such ion exchange generates compressive stresses in the ion exchanged surface layer of a glass article while corresponding tensile stress is developed within the non-ion exchanged interior of the article.

Following the strengthening ion exchange treatment, test samples were cooled, washed, dried, and then examined in various manners. A polarimetric examination enables a determination of the depth of compressive stress as well as the degree of central tensile stress in the glass interior. The degree of compression is reported as modulus of rupture, a value calculated from the force required to break a bar in flexure.

The salt bath treatment for ion exchange must be at a temperature below the glass strain point to void release of the compressive stresses generated and we prefer to exchange at temperatures from 20°C. to 120°C. below the strain point. However, the temperature at which the exchange is conducted must be at least about 350°C. or the rate thereof will be so slow as to approach impracticality. In general, times ranging from 8 up to 24 hours will provide a desired depth of exchange depending upon the temperature employed. Longer times, e.g., 24–48 hours, may be employed, of course, particularly at lower temperatures, providing the central tensile stress does not exceed three kg./mm.$^2$.

We have discovered that the critical part of an ophthalmic lens, from the standpoint of breakage, is the inner surface as the lens is mounted in a frame for wearing. As pointed out earlier, studies show that this surface normally acquires numerous fine scratches up to four mils in depth in service. In order to simulate this service abrasion and impact, a test was devised wherein ten cc. of −18+25 Tyler mesh, hammer milled, common sand was poured through a height of six feet onto the inside surface of a freshly ground lens. The lens was then mounted in usual manner and a ⅝ inch steel ball dropped on the upwardly facing outside surface of the lens. The height at which the lens broke is reported as Ball Drop Height in Table 1.

The blocking effect of the calcium ion on ion exchange, as compared to that of the zinc or magnesium ion, may be seen by comparing the results of an ion exchange treatment in accordance with the invention on the glass of Example 5 with the results of the same treatment on a commercial ophthalmic lens glass of the conventional soda-lime type. The latter is designated as glass A and is available from Corning Glass Works under Code 8361. Lens blanks of this glass having a thickness of approximately three mils were employed in the test.

In Table 2, the glass compositions and pertinent data are compared using the legend of Table 1.

TABLE 2

|  | 5 | A |
|---|---|---|
| $SiO_2$ | 62.1 | 67.8 |
| $Al_2O_3$ | 2.8 | 2.0 |
| MgO | 2.9 | — |
| $Na_2O$ | 8.5 | 8.0 |
| $K_2O$ | 9.5 | 9.2 |
| ZnO | 11.8 | 3.5 |
| $TiO_2$ | 0.7 | 0.5 |
| $Sb_2O_3$ | 0.4 | 0.5 |
| $As_2O_3$ | 0.2 | 0.1 |
| $B_2O_3$ | 1.0 | — |
| CaO | — | 8.4 |
| Soft. Pt. (°C.) | 739 | 726 |
| St. Pt. (°C.) | 505 | 500 |
| Exp. × $10^{-7}$/°C. | 93.6 | 94 |
| Index | 1.524 | 1.523 |
| Time (hrs.) | 16 | 16 |
| Temp. (°C.) | 460 | 460 |
| Depth (mils) | 4.2 | 2.4 |
| CT (kg./mm.$^2$) | 1.9 | 0.7 |
| MOR (psi) | 67 | 50 |
| Ball Drop (in.) | 172 | Failed |

It will be observed that the glass compositions are very similar. The conditions of treatment of each glass were the same. Thus, corresponding glass test pieces were immersed in a molten potassium nitrate bath for 16 hours at a temperature of 460°C. It will be observed that the depth of exchange in the commercial lime glass was less than half of that in the zinc glass. While the MOR (unabraded) was amply high in the lime glass, this essentially disappeared when the glass surfaces were abraded.

Particular attention is directed to the Ball Drop measurements shown above. An unabraded commercial lens will meet requirements of a 50 inch drop test, but a substantial portion of the strengthening stresses are removed when the surface is abraded even slightly. Thus, in the test results above, each of five commercial glass lens blanks tested broke at heights below 50 inches, while the minimum breakage height in the thinner blanks of glass 5 was 172 inches.

The effect of substituting MgO for ZnO on a 1:1 weight basis appears from a comparison of examples 3 and 5 in Table 1. It is apparent that no substantial change occurs.

The rather drastic effect of an alkali metal oxide imbalance is seen by comparing the glass of example 1 in Table 1 with a low $K_2O$ content glass shown in Table 3 as glass B. Table 3 shows the glass compositions in percent by weight together with properties using the legend of Table 1.

TABLE 3

|  | 1 | B |
|---|---|---|
| $SiO_2$ | 63.6 | 65.4 |
| $Al_2O_3$ | 1.8 | 1.9 |
| $Na_2O$ | 7.4 | 13.4 |
| $K_2O$ | 11.2 | 2.6 |
| ZnO | 11.5 | 11.8 |
| $TiO_2$ | 4.2 | 4.4 |
| $As_2O_3$ | 0.3 | 0.5 |
| Soft. Pt. (°C.) | 746 | 717 |
| St. Pt. (°C.) | 513 | 498 |
| Exp. × $10^{-7}$/°C. | 95.0 | 90.1 |
| Index | 1.53 | 1.533 |
| Time (hrs.) | 16 | 16 |
| Temp. (°C.) | 420 | 420 |
| Depth (mils) | 5.1 | 2.5 |
| CT (kg./mm.$^2$) | 1.8 | 1.5 |
| MOR (psi) | 64 | 68 |

It will be noted that the glass of example 1 has a depth of compressive layer about twice that of the low $K_2O$ content glass B. This illustrates the need for a substantial content of $K_2O$ in the glass to accelerate the rate of exchange of the potassium and sodium ions in the glass.

Table 4 compares the glass of example 5 with a similar glass C in which the $Al_2O_3$ and $B_2O_3$ contents are low. The glasses are given in percent by weight and the properties in accordance with the legend of Table 1.

TABLE 4

|  | 5 | C |
|---|---|---|
| $SiO_2$ | 62.1 | 65.5 |
| $Al_2O_3$ | 2.8 | 0.7 |
| MgO | 2.9 | 2.9 |
| $Na_2O$ | 8.5 | 8.4 |
| $K_2O$ | 9.5 | 9.4 |
| ZnO | 11.8 | 11.8 |
| $TiO_2$ | 0.7 | 0.7 |
| $Sb_2O_3$ | 0.4 | 0.4 |
| $As_2O_3$ | 0.2 | 0.2 |
| $B_2O_3$ | 1.0 | — |
| Soft. Pt. (°C.) | 739 | 744 |
| St. Pt. (°C.) | 505 | 500 |
| Exp. × $10^{-7}$/°C. | 93.6 | 92.3 |
| Index | 1.524 | 1.519 |
| Time (hrs.) | 16 | 16 |
| Temp. (°C.) | 460 | 460 |
| Depth (mils) | 4.2 | 3.6 |
| CT (kg./mm.$^2$) | 1.9 | 1.9 |
| MOR (psi) | 67 | 63 |

It will be noted that the depth of layer in the glass of composition C is below that required for satisfactory lens performance, even though $B_2O_3$, which has a deleterious effect on depth of layer, has been removed. It will also be noted that the index drops with the decrease in $Al_2O_3$ and $B_2O_3$. Finally, the glass of example 5 is substantially more durable in standard weathering and acid tests because of the higher $Al_2O_3$ content.

Table 5 compares the glass of example 4 in Table 1 with a similar glass D in which the total ZnO + MgO + $TiO_2$ content is below that required for the present invention. The glass compositions are given in percent by weight and the properties in accordance with the legend of Table 1.

Table 5

|  | 4 | D |
|---|---|---|
| $SiO_2$ | 63.0 | 68.8 |
| $Al_2O_3$ | 2.8 | 2.8 |
| MgO | 2.9 | — |
| $Na_2O$ | 7.6 | 7.6 |
| $K_2O$ | 11.5 | 11.5 |
| ZnO | 8.8 | 8.8 |
| $TiO_2$ | 2.9 | — |
| $As_2O_3$ | 0.5 | 0.5 |
| Soft. Pt. (°C.) | 752 | 732 |
| St. Pt. (°C.) | 509 | 464 |
| Exp. × $10^{-7}$/°C. | 95.7 | 94.3 |
| Index | 1.524 | 1.505 |
| Time (hrs.) | 16 | 16 |
| Temp. (°C.) | 460 | 420 |
| Depth (mils) | 6.0 | 5.2 |
| CT (kg./mm.$^2$) | 2.6 | 1.4 |
| MOR (psi) | 59 | 45 |

It will be noted that glass D differs, compositionwise, in that the MgO and $TiO_2$ are omitted and replaced by $SiO_2$. Thus, the total ZnO + MgO + $TiO_2$ is only 8.8, the ZnO content. The consequence is a markedly lower refractive index and also modulus of rupture. In order to raise these properties to a proper level, it is necessary to add MgO or $TiO_2$, increase the ZnO content, or take a combination of these measures.

As has been emphasized repeatedly above, the preferred glasses are essentially free from CaO since the highest abraded strengths and deepest layers of compression are secured thereby. Thus, the presence of $Ca^{+2}$ ions appear to block the ion exchange reaction. However, very minor amounts, perhaps up to about 3 percent by weight, can be tolerated which permit the use of dolomite as an inexpensive batch material and can improve the melting and forming properties of the glass. Nevertheless, the inclusion of CaO in the glass compositions must be strictly limited since the effect thereof upon the strength that can be obtained through the ion exchange reaction is very marked as is illustrated in Table 6.

Table 6 compares the effect which the substitution of CaO for MgO + ZnO, such that the refractive index remains essentially constant, has upon the abraded strength of the glass. In each instance, cane samples 4 inches × ¼ inch in diameter and bar samples 1½ × 0.080 inch × ¼ inch were immersed into a bath of molten potassium nitrate for 16 hours at a temperature of 480°C.

To simulate minor surface flaws which could be expected to be encountered in service as a result of rubbing against hard materials, the cane samples were subjected to the following abrasion after immersion into the salt bath. Each cane was mechanically mounted and rapidly rotated for 30 seconds in contact with 150 grit silicon carbide paper under a small constant pressure to maintain uniform contact. The bar samples were utilized for polarimetric examination.

Table 6

|  | E % | F % | G % | H % | I % |
|---|---|---|---|---|---|
| $SiO_2$ | 64.1 | 64.4 | 64.7 | 65.0 | 65.3 |
| $Al_2O_3$ | 2.8 | 2.8 | 2.8 | 2.8 | 2.8 |
| MgO | 2.9 | 2.6 | 2.2 | 1.8 | 1.5 |
| $Na_2O$ | 8.1 | 8.1 | 8.1 | 8.2 | 8.2 |
| $K_2O$ | 9.3 | 9.3 | 9.3 | 9.3 | 9.3 |
| ZnO | 11.6 | 10.6 | 9.6 | 8.6 | 7.6 |
| $TiO_2$ | 0.6 | 0.6 | 0.6 | 0.6 | 0.6 |
| $Sb_2O_3$ | 0.5 | 0.5 | 0.5 | 0.5 | 0.5 |
| CaO | — | 1.0 | 2.1 | 3.1 | 4.1 |
| $As_2O_3$ | 0.1 | 0.1 | 0.1 | 0.1 | 0.1 |
| Soft. Pt. (°C.) | 767 | 751 | 750 | 744 | 739 |
| St. Pt. (°C.) | 514 | 505 | 504 | 499 | 501 |
| Exp. × $10^{-7}$/°C. | 94.0 | 95.1 | 93.8 | 94.0 | 95.4 |
| Index | 1.520 | 1.519 | 1.521 | 1.523 | 1.523 |
| Abraded MOR (psi) | 42,000 | 39,000 | 36,000 | 35,000 | 32,000 |
| Unabraded MOR (psi) | 57,000 | 59,000 | 56,000 | 57,000 | 51,000 |
| Depth (mils) | 4.5 | 4.1 | 3.9 | 3.9 | 3.1 |

The deleterious effect which the inclusion of CaO has upon the abraded strength and the depth of the compression layers is immediately evident from a study of Table 6. Hence, at 3% CaO both the strength and the depth of the compression layer have approached the minimum acceptable values. Nevertheless, whereas essentially lime-free glasses are much to be preferred, Table 6 demonstrates that very minor amounts up to about 3 percent can be included without destroying the desired utility thereof.

Based on the compositions described above and minor variations therein to adjust properties, a preferred embodiment of the invention is produced from glasses having compositions within the following ranges:

$SiO_2$ — 55 – 65
$Al_2O_3$ — 2 – 3
$Na_2O$ — 6 – 11
$K_2O$ — 7 – 12
$Na_2O + K_2O$ — 16 – 20
$ZnO$ — 0 – 15
$MgO$ — 0 – 15
$ZnO + MgO$ — 13 – 17
$TiO_2$ — 0 – 4
$B_2O_3$ — 0 – 1.5
$Sb_2O_3 + As_2O_3$ — 0 – 0.8

Example 5 in Table 1 is considered to embody an optimum combination of properties for the production of chemically strengthened, ophthalmic lenses. Therefore, a composition range based on this glass, and embodying normal production tolerances and variations for property control, is our preferred embodiment.

We claim:

1. A chemically strengthened, ophthalmic glass lens having an internal zone in which the tensile stress is less than three kg./mm.$^2$, and a compressively stressed, ion exchanged surface zone that is at least four mils in depth and in which the compressive stresses generate a modulus of rupture that is over 35,000 psi., the lens being molded from a silicate glass consisting essentially of 3–15% $Na_2O$, 3–15% $K_2O$, the total $Na_2O$ plus $K_2O$ being 12–20%, 0–15% $ZnO$, 0–15% $MgO$, 0–5% $TiO_2$, the total $ZnO$ plus $MgO$ being 8–20%, and the total $ZnO$ plus $MgO$ plus $TiO_2$ being 10–20%, 1–5% $Al_2O_3$, 0–5% $ZrO_2$, 0–2% $B_2O_3$, 0–5% other alkali metal oxides and, optionally, minor amounts of glass colorants including $Fe_2O_3$, $CoO$, $NiO$, $Cr_2O_3$, $MnO_2$, $CeO_2$, and $CuO$, the balance of the composition being essentially silica.

2. An ophthalmic glass lens in accordance with claim 1 wherein the glass consists essentially of 55–65% $SiO_2$, 2–3% $Al_2O_3$, 6–11% $Na_2O$, 7–12% $K_2O$, the total $Na_2O$ plus $K_2O$ being 16–20%, 0–15% $ZnO$, 0–15% $MgO$, the total $ZnO$ plus $MgO$ being 13–17%, 0–4% $TiO_2$, 0–1.5% $B_2O_3$, and 0–0.8% $As_2O_3$ plus $Sb_2O_3$.

3. An ophthalmic glass lens in accordance with claim 1 wherein the glass is composed of approximately 62.1% $SiO_2$, 2.8% $Al_2O_3$, 2.9% $MgO$, 8.5% $Na_2O$, 9.5% $K_2O$, 11.9% $ZnO$, 0.7% $TiO_2$, 0.6% $Sb_2O_3$ + $As_2O_3$ and 1.0% $B_2O_3$.

4. An ophthalmic glass lens in accordance with claim 1 wherein the glass further contains up to 3% CaO.

* * * * *